US010953386B2

(12) United States Patent
Kumar Pal et al.

(10) Patent No.: US 10,953,386 B2
(45) Date of Patent: Mar. 23, 2021

(54) FILTRATION MEDIA FOR REMOVING CHLORAMINE, CHLORINE, AND AMMONIA, AND METHOD OF MAKING THE SAME

(71) Applicant: Marmon Water (Singapore) Pte. Ltd., Singapore (SG)

(72) Inventors: Nabin Kumar Pal, Bangalore (IN); Ramachandra Swamy, Bangalore (IN); Sridhar Chowdasandra, Chikkaballapura (IN); Jola Solomon, Bangalore (IN)

(73) Assignee: Mannon Water (Singapore) PTE. LTD., Singapore (SG)

( * ) Notice: Subject to any disclaimer, the term of this patent is extended or adjusted under 35 U.S.C. 154(b) by 214 days.

(21) Appl. No.: 16/234,053

(22) Filed: Dec. 27, 2018

(65) Prior Publication Data

US 2019/0201870 A1    Jul. 4, 2019

Related U.S. Application Data

(60) Provisional application No. 62/638,570, filed on Mar. 5, 2018.

(30) Foreign Application Priority Data

Dec. 29, 2017    (IN) .............................. 201721047329

(51) Int. Cl.
*B01J 21/18*    (2006.01)
*B01J 35/02*    (2006.01)
(Continued)

(52) U.S. Cl.
CPC ........... *B01J 21/18* (2013.01); *B01J 31/0244* (2013.01); *B01J 35/026* (2013.01); (Continued)

(58) Field of Classification Search
CPC ...... B01J 21/18; B01J 31/0244; B01J 35/026; B01J 35/1023; B01J 35/1028; (Continued)

(56) References Cited

U.S. PATENT DOCUMENTS 2,880,167 A * 3/1959 Krebs ...................... B01J 27/22
                                                        208/113
3,018,288 A * 1/1962 Tokime ................ C07D 251/28
                                                        544/191
(Continued)

FOREIGN PATENT DOCUMENTS

CN    10-2553641    * 7/2012    ............. B01J 31/02
CN    10-3626150    * 3/2014    ............. B01D 53/02

OTHER PUBLICATIONS

R. J. J. Jansen, et al. "XPS of Nitrogen-Containing Functional Groups on Activated Carbon." Carbon vol. 33, No. 8 (Feb. 13, 1995).

(Continued)

*Primary Examiner* — Patricia L. Hailey
(74) *Attorney, Agent, or Firm* — DeLio Peterson & Curcio; Robert Curcio (57) ABSTRACT

An activated carbon-based media for efficient removal of chloramines as well as chlorine and ammonia from an aqueous stream is presented, and a method for making the same. The method involves preparing activated carbon that removes chloramines efficiently from chloramine-rich aqueous media. In particular, this application relates to the use of high performance catalytically active carbon for an efficient removal of chloramine from drinking water in the form of a solid carbon block or granular carbon media. The activated carbon is treated with a nitrogen-rich compound, such as, melamine.

19 Claims, 5 Drawing Sheets

(51) Int. Cl.
*B01J 37/06* (2006.01)
*B01J 37/02* (2006.01)
*B01J 37/08* (2006.01)
*B01J 35/10* (2006.01)
*B01J 31/02* (2006.01)
*C02F 1/28* (2006.01)
*C02F 101/12* (2006.01)
*C02F 101/16* (2006.01)

(52) U.S. Cl.
CPC ....... *B01J 35/1023* (2013.01); *B01J 35/1028* (2013.01); *B01J 37/0207* (2013.01); *B01J 37/06* (2013.01); *B01J 37/08* (2013.01); *C02F 1/288* (2013.01); *C02F 1/283* (2013.01); *C02F 1/285* (2013.01); *C02F 2101/12* (2013.01); *C02F 2101/16* (2013.01)

(58) Field of Classification Search
CPC ........ B01J 37/0207; B01J 37/06; B01J 37/08; C02F 1/288; C02F 1/283; C02F 1/285; C02F 2101/12; C02F 2101/16
USPC ..... 502/180, 200, 416; 423/445 R, 351, 352, 423/460; 95/128, 131, 132, 285, 901; 210/500.1, 902, 903
See application file for complete search history.

(56) References Cited

U.S. PATENT DOCUMENTS

| | | | | |
|---|---|---|---|---|
| 4,267,057 A * | 5/1981 | Hager | ............... | C02F 1/283 210/678 |
| 4,624,937 A | 11/1986 | Chou | | |
| 5,338,458 A * | 8/1994 | Carrubba | ............. | C02F 1/283 210/668 |
| 5,356,849 A | 10/1994 | Matviya et al. | | |
| 5,444,031 A | 8/1995 | Hayden | | |
| 5,504,050 A | 4/1996 | Hayden | | |
| 5,670,124 A * | 9/1997 | Itoga | ............... | B01D 53/02 423/235 |
| 5,827,795 A | 10/1998 | Matviya | | |
| 6,342,129 B1 | 1/2002 | Vaughn et al. | | |
| 6,534,442 B1 | 3/2003 | Vaughn et al. | | |
| 6,699,393 B2 | 3/2004 | Baker | | |
| 6,706,194 B2 * | 3/2004 | Baker | ............... | B01J 20/20 210/668 |
| 6,881,348 B2 | 4/2005 | Cannon et al. | | |
| 7,361,280 B2 * | 4/2008 | Baker | ............... | B01D 15/00 210/668 |
| 7,629,285 B2 * | 12/2009 | Popov | ............... | H01M 4/9083 502/180 |
| 7,795,332 B2 | 9/2010 | Hintzer et al. | | |
| 9,174,205 B2 * | 11/2015 | Reimerink-Schats | ............... | B01J 35/1028 |
| 9,359,390 B2 | 6/2016 | Hitomi et al. | | |
| 9,682,865 B2 | 6/2017 | Bae et al. | | |
| 9,692,060 B2 | 6/2017 | Chokai et al. | | |
| 10,702,853 B2 * | 7/2020 | Mazzoccoli | ............... | B01J 20/3078 |
| 2002/0110689 A1 | 6/2002 | Hu et al. | | |
| 2009/0038632 A1 | 2/2009 | Chasmore | | |
| 2011/0042298 A1 | 2/2011 | Stouffer | | |
| 2011/0071022 A1 * | 3/2011 | Bandosz | ............... | B01J 20/0237 502/416 |
| 2011/0136036 A1 | 6/2011 | Miyata | | |
| 2012/0132578 A1 * | 5/2012 | Yoshinobu | ............... | C02F 1/283 210/282 |
| 2013/0168321 A1 * | 7/2013 | Cannon | ............... | B01J 20/3248 210/684 |
| 2014/0037536 A1 | 2/2014 | Reimerink-Schats | | |
| 2014/0231342 A1 | 9/2014 | Yamanoi | | |
| 2015/0376015 A1 * | 12/2015 | Yanagi | ............... | B01J 20/20 423/445 R |
| 2016/0016820 A1 | 1/2016 | Stouffer et al. | | |
| 2016/0023185 A1 | 1/2016 | Tabata | | |
| 2016/0023920 A1 | 1/2016 | Doyle | | |
| 2016/0167982 A1 | 6/2016 | Stouffer et al. | | |
| 2016/0263549 A1 | 9/2016 | Gaur et al. | | |
| 2017/0113202 A1 * | 4/2017 | Shawabkeh | ............... | C01B 32/342 |
| 2017/0326527 A1 | 11/2017 | Kume | | |
| 2018/0229217 A1 | 8/2018 | Mazzoccoli et al. | | |
| 2019/0247831 A1 | 8/2019 | Tramposch et al. | | |
| 2020/0115255 A1 | 4/2020 | Stouffer et al. | | |

OTHER PUBLICATIONS

M. Polovina, et al. "Surface Characterization of Oxidized Activated Carbon Cloth." Carbon vol. 35, No. 8 (Mar. 4, 1997).

Christian L. Mangun, et al. "Oxidation of Activated Carbon Fibers: Effect on Pore Size, Surface Chemistry, and Adsorption Properties." Chem. Mater. vol. 11, No. 12 (Nov. 24, 1999).

B. Saha, et al. "Study of Activated Carbon After Oxidation and Subsequent Treatment Characterization." Trans IChemE vol. 79, Part B (Jul. 2001).

E. Raymundo-Pinero, et al. "The role of different nitrogen functional groups on the removal of SO2 from flue gases by N-doped activated carbon powders and fibres." Carbon vol. 41 (Apr. 17, 2003).

Grzegorz S. Szymanski, et al. "Influence of nitrogen surface functionalities on the catalytic activity of activated carbon in low temperature SCR of NOx with NH3." Catalysis Today vol. 90 (2004).

T. Grzybek, et al. "Nitrogen-Promoted Active Carbons as Catalytic Supports 2. The Influence of Mn Promotion on the Structure and Catalytic Properties in SCR." Catalysis Today vol. 137 (2008).

Denisa Hulicova-Jurcakova, et al. "Combined Effect of Nitrogen- and Oxygen-Containing Functional Groups of Microporous Activated Carbon on its Electrochemical Performance in Supercapacitors" Advanced Functional Materials. vol. 19 (2009).

Mohammad Saleh Shafeeyan, et al. Ammonia Modification of Activated Carbon to Enhance Carbon Dioxide Adsorption: Effect of Pre-Oxidation. Applied Surface Science vol. 257 (2011).

Mohammad Hasan Kasnejad, et al. Effect of Pre-Oxidation for Introduction of Nitrogen Containing Functional Groups into the Structure of Activated Carbons and its Influence on Cu(II) Adsorption. Journal of the Taiwan Institute of Chemical Engineers vol. 43 (2012).

Seredych, et al. "Surface Functional Groups of Carbons and the Effects of Their Chemical Character, Density and accessibility to ions on electrochemical performance." Carbon 46.11 (Sep. 1, 2008) 1475-1488. Abstract p. 1476 col. 2 para 2, p. 1477 col. 2 para 3-4.

* cited by examiner

FILTRATION MEDIA FOR REMOVING CHLORAMINE, CHLORINE, AND AMMONIA, AND METHOD OF MAKING THE SAME

BACKGROUND OF THE INVENTION

1. Field of the Invention

The present invention relates to an activated carbon-based media for efficient removal of chloramines, chlorine, and ammonia from an aqueous stream, and a method for making the same.

2. Description of Related Art

Chloramine is known for use as a secondary disinfectant in municipal water distribution system as an alternative to chlorination with free chlorine. However, concerns over taste, odor, and toxicity associated with chloramine treated water have led to an increase in the demand for water filters with high chloramine removal capabilities. Moreover, due to its strong stability in water, removing chloramine at the point-of-use (POU) or point-of-entry (POE) is more difficult than removing chlorine.

Chloramines are a group of chemical compounds that contain chlorine and ammonia. Chloramines are formed during a reaction between chlorine ($Cl_2$) and ammonia ($NH_3$). Chloramines are amines that contain at least one chlorine atom, which is directly bonded to nitrogen atoms (N). Inorganic chloramines are formed when dissolved chlorine and ammonia react. During this reaction three different inorganic chloramines are formed: monochloramine ($NH_2Cl$), dichloramine ($NHCl_2$), and trichloramine ($NCl_3$).

Chloramines remain active in a water system for a considerably long period of time. Like chlorine, chloramines are selectively reactive and may have damaging affects when they remain in the water for too long.

When chloramines are present, there are usually trace amounts of ammonia and hypochlorite in the water as well. Since chloramines are low molecular weight and have low reactivity, chloramines are difficult to remove from water by reverse osmosis (RO) or water softening. This is particularly true for monochloramine. Boiling and distillation cannot be used either. Substances for chlorine removal cannot be used for the removal of chloramines.

Use of carbonaceous materials, such as activated carbon to remove chloramine from aqueous media is well-known. Standard activated carbon and carbon block products have limited capacity for chloramine reduction. It is also known that improvements in removal of chloramine can be achieved by surface modification of activated carbon, reducing the mean particle diameter of the carbon and by increasing the carbon bed contact time. Many activated carbon particles having catalytic activity have been used to remove chloramine from aqueous streams in the past with their own limitations. For example, in U.S. Pat. No. 5,338,458 issued to Carrubba, et al., titled "METHOD FOR REMOVING CHLORAMINE WITH CATALYTIC CARBON," an improved process is taught for the removal of chloramine from gas/liquid media by contacting the media with a catalytically-active carbonaceous char.

In U.S. Pat. No. 6,699,393 issued to Baker, et al., titled "METHOD FOR REMOVAL OF CHLORAMINES FROM DRINKING WATER," a chloramine removal from fluid streams is disclosed wherein the fluid stream is contacted with an activated carbon, which has been pyrolyzed in the presence of nitrogen-containing molecules, versus a catalytically-active carbonaceous char.

In WIPO Publ. No. 2011/125504 issued to Hitomi, et al., titled "ACTIVATED CARBON AND USES THEREFOR," an activated carbon is disclosed having high catalytic activity containing 1.40-4.30 mass % oxygen, 0.90-2.30 mass % nitrogen, 0.05-1.20 mass % sulfur, and 0.40-0.65 mass % hydrogen.

U.S. Pat. No. 4,624,937 (the "'937 Patent") issued to Chou, titled "PROCESS FOR REMOVING SURFACE OXIDES FROM ACTIVATED CARBON CATALYST," teaches a method for catalytically oxidizing tertiary amines or secondary amines in the presence of oxygen or an oxygen-containing gas to selectively produce secondary or primary amines, which method comprises the step of treating the carbon catalyst to remove oxides from the surface thereof. In a preferred embodiment of the '937 Patent teaching, the surface oxides on the carbon are removed by pyrolyzing the carbon material at a temperature in the range of about 800° C. to about 1200° C. while simultaneously passing a gas stream of an oxygen-containing gas and $NH_3$ through the carbon material in a ratio of up to 90:10 for a time sufficient to remove surface oxides from the carbon. More particularly, the '973 Patent teaches the carbon treatment gas stream to include a $NH_3$/oxygen-containing gas mixture from the group consisting of $NH_3/CO_2$, $NH_3/O_2$, $NH_3/H_2O$, and $NH_3/NO_x$, and preferably the $NH_3$/oxygen-containing gas mixture is $NH_3/H_2O$.

Many works in the prior art utilize environmentally hazardous, expensive reagents to create active carbon by incorporating novel functionalities onto the surface of activated carbon. See, e.g., WIPO Patent Application No. PCT/US13/031366 to Doyle, et al., titled "FILTRATION MEDIUM COMPRISING NITROGEN AND SULFUR;" WIPO Patent Application No. PCT/US14/021670 to Stouffer, et al., titled "REMOVAL OF ORGANIC COMPOUNDS AND CHLORAMINE FROM AQUEOUS SOLUTIONS;" and U.S. Pat. No. 9,446,328 to Stouffer, et al., titled "FILTRATION MEDIUM COMPRISING METAL CONTAINING PARTICULATE." However, most of the materials as reported earlier have been found lacking in effectiveness for chloramine removal from drinking water.

WO Patent Application No. PCT/US12/052502 of Stouffer, et al., titled "FILTRATION MEDIUM COMPRISING A CARBON OXYCHALCOGENIDE," discloses the use of sulfur-containing compounds such as elemental sulfur, $SO_2$, $SOCl_2$, $SO2Cl2$, $CS_2$, COS, $H_2S$, and ethylene sulfide and sulfur analogs of epoxides, which are thermally treated with a carbon substrate wherein the sulfur in the form of a metal sulfide is at least 0.5% by weight of the filtration media.

WO Patent Application No. PCT/US12/070300 of Siedle et. al., titled "FILTRATION MEDIUM COMPRISING A METAL SULFIDE," discloses the use of metal sulfides (copper sulfide, iron sulfide, manganese sulfide, zirconium sulfide, zinc sulfide, niobium sulfide, molybdenum sulfide, and tungsten sulfide and oxysulfides of these metals, such as molybdenum oxysulfide), which are thermally treated with a carbon substrate.

WO Patent Application No. PCT/US12/069414 of Stouffer (also published as U.S. Pat. No. 9,446,328), titled "FILTRATION MEDIUM COMPRISING A METAL-CONTAINING PARTICULATE," discloses the use of metal salts (including metal salts or metal complexes) comprising a sulfur-containing anion. The sulfur-containing anions have an anion selected from at least one of a sulfate, sulfamate, sulfite, bisulfate, bisulfite, and/or thiosulfate ion.

WO Patent Application No. PCT/US13/031366 of Doyle, titled "FILTRATION MEDIUM COMPRISING NITROGEN AND SULFUR," discloses a filtration medium comprising an active chloramine removal material, wherein the active chloramine removal material comprises carbon, nitrogen, and sulfur wherein the sum of the sulfur and nitrogen in the active chloramine removal material is at least 4.0 mass %.

WO Patent Application No. PCT/US14/020662 to Doyle et. al., titled "REMOVAL OF CHLORINE AND/OR CHLORAMINE FROM AQUEOUS SOLUTIONS," describes a method of removing chlorine from an aqueous solution by: providing an aqueous solution having chloramine and/or chlorine; and contacting the aqueous solution with a medium having a porous carbon substrate having at least 1.5% by mass of sulfur.

Most of the aforementioned prior art work for preparing catalytically active chloramine removal media have certain disadvantages which limit their overall utility and practicality. For example, many prior art methodologies and treated carbon use expensive and toxic precursors as a source of sulfur and nitrogen, e.g., polyacrylonitrile or polyamide, $CS_2$, metal sulfide, ammonia, thio-compounds, etc. Many of the precursor compounds used in the prior art have been found to generate large amounts of cyanide, hydrogen-sulfide, and other toxic gases during thermal treatment. Accordingly, it is the object of this invention, more specifically, to provide a method of preparing catalytic activated carbon using less expensive, environmentally friendly precursor compounds that exhibits high and consistent performance for removal of chloramine as well as chlorine from water thus enabling a single filtration media for removal of multiple impurities with improved shelf life. It is a further objective that the carbon media, as developed in the present invention, has much improved chloramine/chlorine removal efficiency over the prior art. Finally, it is an object of this invention to provide an improved method and catalytically active carbon media for removal of chloramines in the form of a solid activated carbon block.

SUMMARY OF THE INVENTION

Bearing in mind the problem and deficiencies in the prior art, it is a primary object of the present invention to provide a novel, economically friendly method of preparing activated carbon media that are catalytically highly active and far more efficient in removing chloramine from drinking water as compared to existing commercial activated carbon materials. Removal of chlorine and ammonia may also be achieved utilizing the treated, activated carbon of the present invention.

The present invention is directed to, in a first aspect, a method of making catalytically activated carbon particles by providing a starting material in the form of an activated carbonaceous product and soaking the activated carbonaceous product in an acid solution to form acid treated carbon. The acid treated carbon is dried and then exposed to a nitrogen-rich compound to form nitrogen-rich impregnated carbon particles. These nitrogen-rich impregnated carbon particles are heated in an inert atmosphere and then cooled to form catalytically activated nitrogen-rich carbon particles that remove chloramines, chlorine, and/or ammonia from aqueous media.

In the invention the activated carbonaceous product may include coconut based activated carbon or coal based activated carbon in either granular (GAC) or powdered (PAC) form. The activated carbonaceous product may have a surface area of ranging from about 800 $m^2/g$ to about 1300 $m^2/g$. The activated carbonaceous product is preferably soaked in an acid solution including 15% nitric acid for approximately three hours. The acid treated carbon may be dried until moisture content of the acid treated carbon is about or less than two (2) %. This drying step may be at a temperature of approximately 80° C.

In the step of exposing the acid treated carbon to a nitrogen-rich compound, the acid treated carbon may be contacted by the nitrogen-rich compound in either solid phase or solution. The nitrogen-rich compound may be melamine (1,3,5-Triazine-2,4,6-triamine, $C_3H_6N_6$, molar mass 126.12 g/mol) having over 60% of nitrogen by total mass. The melamine may be approximately between 10%-15% of the weight of the activated carbonaceous product. The melamine may be added to water to form a white suspension, and the suspension is used to impregnate the acid-treated carbon.

The nitrogen-rich compound may be a nitrogen-rich triazine compound. For instance, the nitrogen-rich triazine compound may be cyanuric acid, ammelide, ammeline, trichloromelamine, or even combinations thereof. The nitrogen-rich impregnated carbon particles may be heated in an inert atmosphere at a temperature in the range of 750° C. to 800° C. The inert atmosphere may be argon gas or nitrogen gas. The resultant catalytically activated nitrogen-rich carbon particles may be cooled in an oxygen-free or inert atmosphere to room temperature.

In another aspect the invention is directed to methods of making a filter media for removing chloramines, chlorine, and/or ammonia. The methods include providing a starting material in the form of an activated carbonaceous product, soaking the activated carbonaceous product in an acid solution to form acid treated carbon, and then drying the acid treated carbon. The acid treated carbon is exposed to a nitrogen-rich compound to form nitrogen-rich impregnated carbon particles. The nitrogen-rich impregnated carbon particles are heated in an inert atmosphere, and then cooled to form catalytically activated nitrogen-rich carbon particles. These to form catalytically activated nitrogen-rich carbon particles are formed into a bed or filter housing to remove chloramines, chlorine, and/or ammonia from aqueous media.

In still another aspect the invention is directed to a filter media that includes an activated carbonaceous product impregnated with a nitrogen-rich compound to provide, after heating and cooling, catalytically activated nitrogen-rich carbon particles that remove chloramines, chlorine, and/or ammonia from aqueous media. The activated carbonaceous product may include coconut based activated carbon or coal based activated carbon, and have a surface area of ranging from about 800 $m^2/g$ to about 1300 $m^2/g$. The nitrogen-rich compound may be a nitrogen-rich triazine compound such as, for example, cyanuric acid, ammelide, ammeline, trichloromelamine, or even combinations thereof. Further, the nitrogen-rich compound may be melamine (1,3,5-Triazine-2,4,6-triamine, $C_3H_6N_6$, molar mass 126.12 g/mol) having over 60% of nitrogen by total mass, wherein the nitrogen-rich compound is approximately 10%-15% weight of the coconut based activated carbon or coal based activated carbon.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s), which follows, taken in conjunction with the accompanying drawings of the invention in which:

DESCRIPTION OF THE PREFERRED EMBODIMENT(S)

In describing the preferred embodiment of the present invention, reference will be made herein to FIGS. 1-10 of the drawings in which like numerals refer to like features of the invention. Features of the invention are not necessarily shown to scale.

A method of preparing catalytic activated carbon media for enhanced removal of chloramine from aqueous media is presented. The catalytic activated carbon is prepared from carbon materials in a sequential process, which may include at least three (3) or more steps. In accordance with the invention, the activated carbon may be of different material sources, such as, for example, coconut-shell based activated carbon, coal-based activated carbon, wood-based activated carbon etc. The activated carbon may further be classified into granular activated carbon, powder activated carbon, and extruded activated carbon, all of which are based on the mean particle dimensions and shapes. Granular activated carbon is irregular shaped particles having sizes ranging from 0.2 to 5 mm. Powder activated carbon is pulverized carbon generally having a particle size distribution ranging from 5 to 150 Å. Extruded activated carbon is cylindrical pellets with diameters ranging from 1 mm to 5 mm. Surface area and porosity plays a major role in the process of adsorption by the activated carbon. Generally, the higher the internal surface area and pore volume, the higher the effectiveness of the carbon.

Coconut shell based activated carbon has a greater number of micropores (pore size less than 2 nm), as compared to coal (more mesopores and less micropores) and wood (more mesopores and macropores) activated carbon. Coconut shell based activated carbon is well suited for water treatment application e.g. dichlorination, dechloramination etc. In accordance with one or more preferred embodiments of the invention, the activated carbon may include a coconut-based carbon or a coal-based carbon, either in granular (GAC) or powdered form (PAC). It is preferable that the carbon-based support is porous having high surface area ranging from about 800 $m^2/g$ to about 1300 $m^2/g$, based on the Brunauer Emmet Teller (BET) method for nitrogen adsorption. In one or more embodiments the carbon-based support may have a porous surface area of at least 1000 $m^2/g$ based on BET method.

A first step includes soaking the activated carbon in an acid solution having strong oxidizing capabilities. For instance, the strong oxidizing acid agent may include, but is not limited to, nitric acid, sulfuric acid, perchloric acid, and the like. Use of sulfuric acid and perchloric acid require care in handling since they are highly corrosive in nature. They also both have high boiling points. The boiling point of sulfuric acid is 337° C. while the boiling point of perchloric acid is 203° C., both of which are much higher than the boiling point of nitric acid which is 83° C. Nitric acid is used in one or more preferred embodiments since it is a strong oxidizing agent, has ease of handling, and a low boiling point.

In one or more preferred embodiments, the activated carbon was soaked in a nitric acid solution (15% v/w nitric acid) at room temperature (does not require elevated temperature) for approximately three hours. This acid soaking step generates activated carbon having a desired pH of 3-4, in accordance with the invention. Anything less than or more than 15% v/w nitric acid soak may affect the final performance of the product. After the acid soak step, the activated carbon with pH 3-4 is dried in a tunnel drier/fluidized bed reactor at a low temperature, preferably at approximately 80° C., until the final moisture content of the acid treated carbon is less than approximately 2%. The nitric acid is easily removed and does not require an elevated temperature in the drying process.

The acid-treated activated carbon is then contacted or exposed to a nitrogen-containing, preferably a nitrogen-rich, compound either in solid phase or in solution. The preferred nitrogen-rich compound used in the present invention is melamine (1,3,5-Triazine-2,4,6-triamine, $C_3H_6N_6$, molar mass 126.12 g/mol) which contains 67% nitrogen by total mass.

The nitrogen-containing compound, e.g., melamine, is added to water to form a nitrogen-rich suspension, and the suspension is used to wet the acid-treated carbon particles. In the invention melamine is used as a source of nitrogen functionalities. Melamine is a trimer of cyanamide and alkaline in nature which readily form a non-covalent adduct/complex with the acid-treated activated carbon by an extensive two-dimensional network of hydrogen bonds. The reaction product of melamine and the acid-treated activated carbon provides nitrogen-rich impregnated carbon particles in accordance with the invention.

In one or more embodiments, the nitrogen-rich compound, e.g., melamine, may be present in amounts between 10%-15% of the weight of carbon substrate, although lesser amounts may be used so long as there is sufficient nitrogen present in the product to produce an active chloramine removal material. While amounts of 10%-15%, or less, are described in relation to one or more embodiments of the invention, it should be appreciated that more than 15 weight percent nitrogen-rich compound to carbon may be used in accordance with the invention.

While melamine, a nitrogen-rich heterocyclic triazine, is described in conjunction with one or more embodiments of the invention, it should be appreciated that other nitrogen-rich related triazine compounds may be suitable for use in accordance with the invention. For instance, the nitrogen-rich compound may include, but is not limited to, cyanuric acid ($C_3H_5N_3O_3$), ammelide ($C_3H_4N_4O_2$), ammeline ($C_3H_5N_5O_2$), trichloromelamine ($C_3H_3Cl_3N_6$), cyromazine ($C_6H_{10}N_6$), and the like, or even combinations thereof.

In one or more embodiments of the invention, approximately 12.5 wt. % melamine (14.3 g of melamine per 100 g of acid-treated carbon) was added to a sufficient amount of water to form a white milky suspension. A calculated amount of acid-treated activated carbon is loaded into a ribbon blender, followed by pouring the white suspension of melamine into the ribbon blender. The mixture of acid-treated activated carbon and melamine suspension is homogeneously mixed for about 4 hours.

After 4 hours of mixing, the nitrogen-rich impregnated carbon (i.e., the melamine-impregnated carbon) is centrifuged to remove excess water and any remaining impurities. The melamine-impregnated carbon is then dried in a tunnel drier until the moisture level reaches less than 2%. Finally, the dried nitrogen-rich impregnated carbon (i.e., the melamine-impregnated carbon) is loaded into a retort and heated inside at a temperature of 750° C. to 800° C. for 5 hours under a continuous supply of nitrogen gas. It should be appreciated that any nitrogenous compounds or compounds that, after decomposition, forms nitrogen functionalities may be used in the invention. For example, urea may be used in the invention. Derivatives of melamine e.g. cyanuric acid ($C_3H_5N_3O_3$), ammelide ($C_3H_4N_4O_2$), ammeline ($C_3H_5N_5O_2$) may also be used in the invention. Various other nitrogen-based or nitrogen-containing compounds such as pyridinium, guanidinium, morpholinium, imidazolium, triazole, cyanate having nitrogen, and the like, or even combinations thereof, may be used in the invention.

The resultant nitrogen-rich impregnated carbon particles are then dried and heated at a high temperature to generate the catalytically activated nitrogen-rich carbon particles. The thermal treatment of the nitrogen-rich impregnated carbon particles is carried out at a temperature that is sufficient to thermally decompose the nitrogen-rich compound, e.g., melamine, and enable its reaction with activated carbon particles (i.e., reaction between the surface of the carbon particles and the nitrogen-rich compound, e.g., melamine). In a preferred embodiment, the thermal treatment is carried out preferably between 750° C.-800° C. for about 4 hours under an atmosphere that is inert, such as for example an argon or nitrogen atmosphere. The thermally treated nitrogen-rich impregnated carbon particles are then cooled in an oxygen-free or otherwise inert atmosphere to ambient temperature to provide the resultant catalytically activated nitrogen-rich carbon particles that is able to remove chloramines, chlorine, and/or ammonia from aqueous media. The resultant high performance catalytically activated nitrogen-rich carbon particles efficiently remove chloramine from drinking water in the form of a solid carbon block or granular carbon media. Chlorine and ammonia may also be removed via this carbon-based media.

The resultant nitrogen-rich impregnated carbon of the invention contains greater amount of catalytically active nitrogenous species than that of the raw activated carbon precursor material. For example, coconut-shell based raw activated carbon used in this invention contains only 0.3% nitrogen by total mass, whereas the treated carbon product (after treatment with melamine) contains about 3.0% nitrogen (10 times more) by total mass (see the table below). This greater amount of catalytically active nitrogenous species in the inventive resultant treated carbon product contributes to the better performance thereof. Table I below shows concentrations of various elements in the resultant nitrogen-rich 'treated carbon product' of the invention and the coconut-shell based raw activated carbon (in Weight %).

TABLE I

| Sample | C | N | O | Na | Si | Cl | K |
|---|---|---|---|---|---|---|---|
| Treated carbon product | 84.5 | 3.0 | 9.3 | 0.3 | 0.7 | — | 2.3 |
| Coconut-shell based raw activated carbon | 86.5 | 0.3 | 7.2 | 0.2 | 0.2 | 0.4 | 5.2 |

Characterization of Surface Composition

The surface composition of the resultant high performance catalytically activated nitrogen-rich carbon particles of the invention is evaluated and characterized by X-ray Photoelectron Spectroscopy.

To perform the characterization, the pH of the carbon surface was first evaluated using ASTM Method D6851-02. Using a graduated cylinder, 100 mL of water was measured and added to the 10-gram sample in the beaker. The solution was then stirred for ten minutes with sufficient turbulence to fluidize the sample in the beaker. After 10 minutes, stirring was stopped and without delay or filtering, pH of the suspension was measured using a pH-meter.

Next, the surface area and pore size were analyzed. Nitrogen isotherms were measured using an ASAP 2020 instrument (Micromeritics) at −196° C. Before the experiment, the samples were heated to approximately 120° C. and then outgassed overnight at this temperature under a vacuum of $10^{-5}$ Torr to constant pressure. The isotherms were used to calculate the specific surface areas, micropore volumes, and pore size distributions. These parameters were obtained using the density functional theory (DFI) approach. The surface area was also calculated using the Brunauer, Emmett, and Teller (BET) method.

The apparent density of carbons was evaluated using ASTM Method D 2854. It was determined by measuring the volume packed by free fall from a vibrating feeder into an approximately sized graduated cylinder and determining the mass of the known volume.

Elemental compositions and chemical states of the resultant product were analyzed by X-ray photoelectron spectroscopy (XPS), using an ESCA Lab 250Xi (Thermo Fisher) at a base pressure below or equal to $10^{-9}$ Torr preferably to create an ultra-high vacuum in order to maximize surface sensitivity. The monochromatic Al K alpha (1486.6 eV) X-ray source was operated at 140 Watts (14 KV, 10 mA). Survey and high-resolution spectra were obtained using a hemispherical electron energy analyzer, which was operated at constant pass energy of 160 eV for survey and 20 eV for high resolution. The binding energy (BE) scale was calibrated relative to the BE of C1s peak. The C1s line (binding energy of C1s) has been used to calibrate the binding-energy scale for XPS measurements. A binding energy of 284.6±0.2 eV has been assumed for this purpose. The spectra were acquired at 90° take-off angle with respect to the sample surface. Data processing was then performed using software, such as Casa XPS Version 2.3.16 Dev41 software. Surface compositions were calculated from measured photoelectron peak areas in survey spectra after correction for appropriate Scofield ionization cross sections. The reported overall atomic concentrations are mean values derived from the survey spectra collected at multiple randomly selected sample regions (at least 5 different points). The surface content of catalyst functional groups was determined by de-convolution/curve fitting analysis of C1s (carbon 1s), O1s (oxygen 1s), N1s (nitrogen 1s), and S2p (sulfur 2p) core level spectra. The curve fitting analysis was based on the summed Gaussian/Lorentzian GL function and Shirley-type background subtraction.

Etching Process

Etching was carried out by bombarding the surface in situ with Ar+ ions (monoatomic mode) accelerated to 2000 eV for 60s. The etching step cleans the resultant catalytically activated nitrogen-rich carbon particles prior to performing the XPS process to allow accurately profiling concentrations of species of the resultant product. The relevant high-resolution core line spectra, i.e., K2p, Li1s, Nb3d and O1s, of the bombarded surface were repeatedly collected 20 times. The measured data were fitted to the Gaussian peak shape with the Shirley type baseline.

The samples of the invention analyzed included the following: 1) raw coconut shell based carbon (Core carbon); 2) treated carbon product under test; 3) Jacobi Carbon AquaSorb™ PAC-S; 4) Jacobi Carbon AquaSorb™ CX-MCA; 5) Centaur Carbon 12×40 (Calgon Carbon); 6) Aquaguard™ powder (Oxbow Activated Carbon LLC); 7) Hydro Darko, Lignite carbon HDB 3000 (Cabot Corporation); 8) Kuraray carbon PKC 80×325 (Kuraray Co. Ltd.); 9) Selecto carbon (Selecto, Inc.); and 10) 3M Water filter, HF95-CL (3M Specialty Products).

Chloramine removal capacity of the reaction product disclosed in the present invention was evaluated both in powder as well as in the form of activated carbon block. In designing filtration media, it is always advantageous to have media that can quickly react with the contaminant of interest. It has been found that filtration media made using the reaction product disclosed herein can provide a fast reaction rate, and thus yields good performance for the removal of chloramines.

Results

XPS Spectra tests were performed on raw carbon and various treated activated carbons in accordance with the present invention. The results are shown in Tables II and III below. Tests were performed on products both before and after etching. The binding energies and corresponding atomic percentages were determined to confirm the presence of at least carbon (C), oxygen (O), and nitrogen (N) in the samples of the invention, as well as various other materials as indicated in the below tables. The atomic percentage is the percentage of one kind of atom relative to the total number of atoms present in the compound. Binding energy values were obtained at 284.8 eV (BE for C1s), 532.4 eV (BE for O1s) and 399.3 eV (BE for N1s) to confirm the presence of at least C, O and N in the various tested samples of the invention.

Summary A: A consolidated elemental composition of all samples (in atomic %) is provided in Table II below.

TABLE II

| Samples | C1s | O1s | N1s | S2p | Ti2p | Si2p | Ca2p | Al2p | Mg1s | Cl2p |
|---|---|---|---|---|---|---|---|---|---|---|
| Raw Carbon | 92.3 | 7.03 | — | — | — | — | — | — | — | — |
| resultant nitrogen-rich Carbon Prod. | 91.2 | 6.08 | 2.71 | — | — | — | — | — | — | — |
| AquaSorb ™ PAC-S | 92.8 | 6.42 | 0.89 | — | — | — | 0.30 | — | — | — |
| AquaSorb ™ CX-MCA | 93.3 | 5.56 | 0.73 | — | — | — | — | — | — | 0.33 |
| Centaur Carbon | 92.65 | 6.25 | 0.96 | — | — | 0.77 | — | — | 0.73 | — |
| Aquaguard ™ powder | 95.33 | 2.7 | 1.97 | — | — | — | — | — | — | — |
| Hydro Darko HDB 3000 | 85.43 | 10.64 | 0.96 | 0.41 | — | 1.48 | 1.21 | 0.88 | — | — |
| Kuraray PKC | 94.5 | 4.97 | 1.10 | 0.30 | — | — | — | — | — | — |
| Selecto Carbon | 95.14 | 2.72 | 2.14 | — | — | — | — | — | — | — |
| 3M water filter HF95-CL | 94.05 | 3.90 | 1.71 | — | 0.83 | — | — | — | — | — |

Summary B: A consolidated elemental composition of all samples (in weight. %) is provided in Table III below.

The formula for conversion of atomic % into weight % is provided in the following example.

Given two elemental constituents, "x" and "y, a conversion from At. % to Wt. % is calculated from the equation:

$$Wt\ \% = \frac{(At.\ \%\ x)(At.\ Wt.\ x)}{(At.\ \%\ x)(At.\ Wt.\ x) + (At.\ \%\ y)(At.\ Wt.\ y)} \times 100$$

TABLE III

| Samples | C (Wt. %) | O (Wt. %) | N (Wt. %) | S (Wt. %) | Ti (Wt. %) | Si (Wt. %) | Ca (Wt. %) | Al (Wt. %) | Mg (Wt. %) | Cl (Wt. %) |
|---|---|---|---|---|---|---|---|---|---|---|
| Raw Carbon | 90.78 | 9.22 | — | — | — | — | — | — | — | — |
| Treated carbon Product Under Test | 89.03 | 7.91 | 3.08 | — | — | — | — | — | — | — |
| AquaSorb ™ PAC-S | 89.75 | 8.27 | 1.01 | — | — | — | 0.97 | — | — | — |
| AquaSorb ™ CX-MCA | 90.98 | 7.22 | 0.83 | — | — | — | — | — | — | 0.95 |
| Centaur Carbon | 87.94 | 7.90 | 1.06 | — | — | 1.70 | — | — | 1.38 | — |
| Aquaguard ™ powder | 94.18 | 3.56 | 2.27 | — | — | — | — | — | — | — |
| Hydro Darko HDB 3000 | 76.81 | 12.75 | 1.01 | 0.99 | — | 3.10 | 3.63 | 1.71 | — | — |
| Kuraray PKC | 91.56 | 6.42 | 1.24 | 0.78 | — | — | — | — | — | — |
| Selecto Carbon | 93.95 | 3.58 | 2.46 | — | — | — | — | — | — | — |
| 3M water filter HF95-CL | 89.96 | 4.97 | 1.90 | — | 3.16 | — | — | — | — | — |

A Treated Carbon Product Under Test used in the performance evaluation was made using 12.5% (w/w) of melamine and 100×325 meshed (Example 1, 2, 3) or −325 meshed (Example 4) coconut-shell based activated carbon following the process as described earlier.

To evaluate the chloramine removal performance of the treated carbon product under test in the powder form, an input chloramine solution of concentration 500 ppm was prepared by adding appropriate amount of commercial bleach (sodium hypochlorite) and solution of ammonium chloride to deionized water and stirred for 1 hour. The pH was adjusted to 7.5-8 by the addition of sodium carbonate.

100 ml of 500 ppm chloramine solution was equilibrated at a temperature of 21° C. followed by addition of carbon test samples (250 mg). The solution was then agitated, and a stopwatch started to record elapsed time. After a specific period of time the solution was immediately filtered to remove the carbon from treated water. The actual time of filtration of the carbon/water suspension was recorded as the elapsed time for that solution. The aqueous filtrates were analyzed for chloramine content immediately using DPD (N, N-diethyl-p-phenylenediamine) reagent "pillow" for total chlorine determination (Hach Company, Catalog Number 21056-69). The reagent pillow was added to the filtrate (10 ml) and the sample vial shaken for 20 seconds to develop the characteristic magenta color of the "Wurster dye" DPD-oxidation product. The absorbance of the filtrate at a wavelength of 515 nm was measured and the concentration of chloramine remaining in the water was calculated using the appropriate calibration. A "blank" colorimetry measurement was made on the high purity water used to prepare the chloramine solutions to ensure that the absorbance at 515 nm was ±0.001. The test was done for different elapsed times e.g. at 2 min, 5 min, 10 min, 15 min, 20 min, and 25 min.

Example 1

The following carbon test samples were used in this study:
1. Reaction product disclosed in this invention (mesh size 100×325);
2. MEADWESTVACO AQUAGUARD 325" (80×325 mesh) from MeadWestvaco Specialty Chemicals, North Charleston, S.C.) used as received without further treatment;
3. Kuraray 80×325 from Kuraray Chemical, Osaka Japan; and
4. FX™ ChloraGuard® (mesh size 100×325) from Filtrex Technologies Pvt. Ltd, Bangalore, India.

Figure 1:
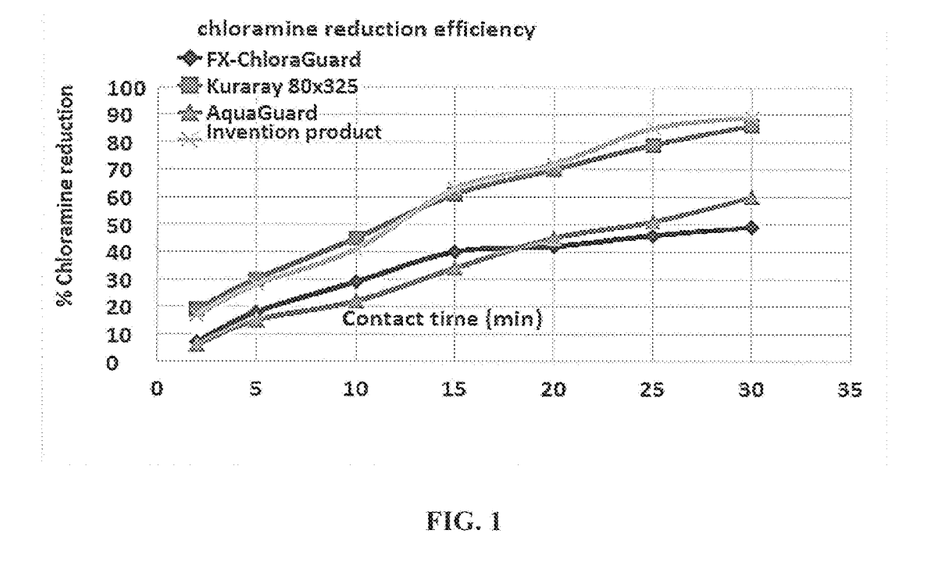
FIG. 1 depicts results of example 1 showing the percentage removal of chloramine at different contact times for the prior art compositions FX™-ChloraGuard®, Kuraray 80×325, and Aquaguard™ (MeadWestvaco), as compared to the treated nitrogen-rich carbon products of the present invention.

FIG. 1 depicts the percentage removal of chloramine at different contact time for FX™-ChloraGuard®, Kuraray 80×325, Aquaguard™ (MeadWestvaco), as compared to the catalytically activated nitrogen-rich carbon products of the present invention.

Table IV depicts Chloramine removal capacity measured in terms of mg/g (mg of chloramine removed per g of carbon sample added) at 20 minutes of contact time.

TABLE IV

| | FX ™-ChloraGuard ® | Kuraray 80 × 325 | Aquaguard ™ | Nitrogen-rich Carbon Products |
|---|---|---|---|---|
| Chloramine removal capacity (mg/g) | 80 | 130 | 92 | 132 |

Evaluation of Chloramine Removal Performance of the Reaction Treated Carbon Product in the Form of an Activated Carbon Block (Cylindrical)

A fixed amount of selected carbon substrate was blended (for 3-4 mins) with a binder material, such as a polyethylene, e.g., an ultra-high molecular weight polyethylene, or a high-density polyethylene (HDPE) at a carbon substrate to binder ratio 70:30 (w/w). The mixture was then quantitatively transferred to a cylindrical shaped mold with a hollow cylindrical core. The mold was filled using an impulse filling to the maximum uncompressed density. The mold was covered and then heated in a convection oven at 180-200° C. for 50 minutes.

After heating, the mold was immediately compressed with a piston to a fixed block length. The mold was cooled to room temperature and the resulting carbon block was removed from the mold. End caps were applied to the block using hot melt glue. The as-prepared carbon block was then placed into a standard filtration vessel that allowed radial flow from the outside to the inside of the filter media. The vessel was equipped with an inlet and outlet. The aqueous chloramine test solution was run through the filtration system at a given flow rate.

The Chloramine removal test was performed in a flow-through system per a method based on the NSF/ANSI Standard 42 (Drinking Water Treatment—Aesthetic Effects. A 3 mg/L aqueous chloramine test solution was prepared having a pH of 7.6 total dissolved solids of 200-500 mg/L; a hardness less than 170 mg/L as $CaCO_3$; turbidity of less than 1 Nephelometric Turbidity Units; and a temperature of 20±3° C. The chloramine concentration was controlled at 2.7-3.3 mg/L by the addition of a sodium hypochlorite solution and then addition of an ammonium chloride solution. The pH was controlled by adding sodium hydroxide as needed.

The aqueous chloramine test solution described above was flowed through the filtration system for 5 minutes to wet out the carbon block sample. After this, samples of the effluent (outflow from the carbon block sample) were taken periodically and the throughput in liter was recorded. Effluent samples were analyzed for chloramine by the DPD Total Chlorine Method, Hach Method 8167, which Hach Company claims to be equivalent to USEPA Method 330.5. The free chlorine ($OCl^-$) concentration was periodically measured by the DPD Free Chloramine Analysis, Hach Method 8021, which Hach company claims is equivalent to EPA Method 330.5. Free chlorine was maintained at a negligible concentration (<0.2 ppm), thus, the total chlorine analysis was considered a good approximation of the concentration of chloramines in the effluent. The chloramine effluent concentration was then plotted as a function of the aqueous chloramine test solution throughput. The maximum effluent chloramine concentration per NSF 42 is 0.5 mg/L. Capacity of the carbon block sample is reported as the throughput attained before the concentration of chloramines in the effluent rises above 0.5 mg/L.

Example 2

Comparative Chloramine Removal Performance Test of an Example of the Present Catalytically Activated Nitrogen-Rich Carbon Product Against Other Competing Products in the Form of a Block Under the Application of Pressure Block dimensions:

Length (L) 236 mm

Inner diameter (ID) 31 mm

Outer diameter (OD) 60 mm

Carbon to binder ratio: 70:30 by weight

Total weight including cap 430 g

Net weight of carbon used (excluding binder and cap weight): approx. 280 g

Experimental flow rate 1 gpm

Figure 2:
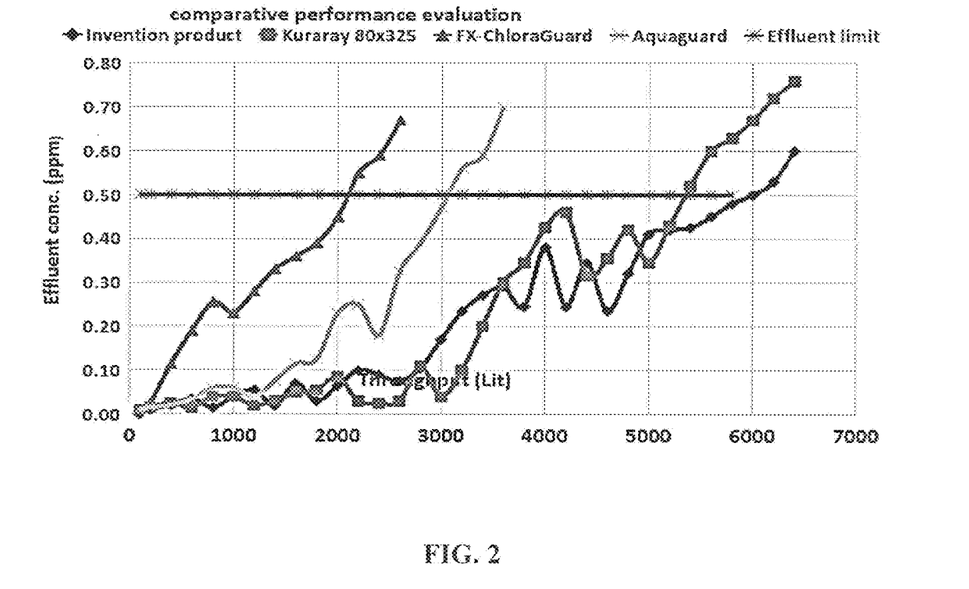
FIG. 2 depicts concentration of chloramine (ppm) in the effluent versus throughput (L) for the treated carbon product, Aquaguard™, Kuraray 80×325, and FX™-ChloraGuard®, respectively, tested based on Example 2.

FIG. 2 depicts concentration of chloramine (ppm) in the effluent versus throughput (L) for the treated carbon product, Aquaguard™, Kuraray 80×325, and FX™-ChloraGuard®, respectively, tested based on Example 2.

Table V summarizes the approximate chloramine removal capacities for the carbon blocks tested based on Example 2.

TABLE V

| Carbon material used to make carbon block | Chloramine removal capacity (L) |
|---|---|
| EPC5 (Brand name FX ™ ChloraGuard ®) | 2200 |
| Kuraray 80 × 325 | 5200 |
| Aquaguard ™ | 3000 |
| Treated carbon product | 6000 |

Example 3

Block Dimensions:

Length (L) 180 mm; Inner diameter (ID) 10 mm;

Outer diameter (OD) 47 mm

Carbon to binder ratio: 70:30 by weight;

Total weight including cap 190 g

Net weight of carbon used (excluding binder and cap weight): approx. 125 g

Experimental flow rate 0.53 gpm

Figure 3:
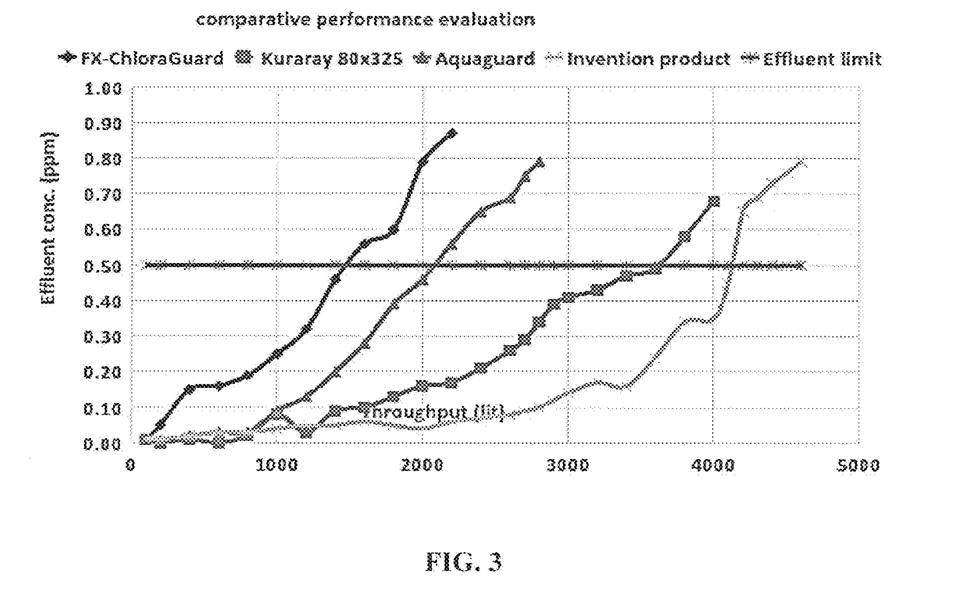
FIG. 3 depicts the concentration of chloramine (ppm) in the effluent versus throughput (L) for the treated carbon product of the present invention, Aquaguard™ Kuraray 80×325, and FX™-ChloraGuard® tested based on Example 3.

FIG. 3 depicts the concentration of chloramine (ppm) in the effluent versus throughput (L) for the treated carbon product of the present invention, Aquaguard™ Kuraray 80×325, and FX™-ChloraGuard® tested based on Example 3.

Table VI summarizes the approximate chloramine removal capacities for the carbon blocks tested based on Example 3.

TABLE VI

| Carbon material used to make carbon block | Chloramine removal capacities (L) |
|---|---|
| EPC5 (Brand name FX ™ ChloraGuard ®) | 1400 |
| Kuraray 80 × 325 | 3400 |
| Aquaguard ™ | 2100 |
| Treated carbon product | 4200 |

Example 4

The effect of particle size on the final chloramine removal performance of carbon block was then determined.

A test block was made using following carbon:

100% treated carbon product (100×325)

90% treated carbon product (mesh size 100×325)+10% treated carbon product (mesh size −325)

Block Dimension:

Length (L) 180 mm; Inner diameter (ID) 10 mm; Outer diameter (OD) 47 mm

Carbon to binder ratio: 70:30 by weight

Total weight including cap 190 g;

Net weight of carbon: approx. 125 g

Experimental flow rate 0.53 gpm

Figure 4:
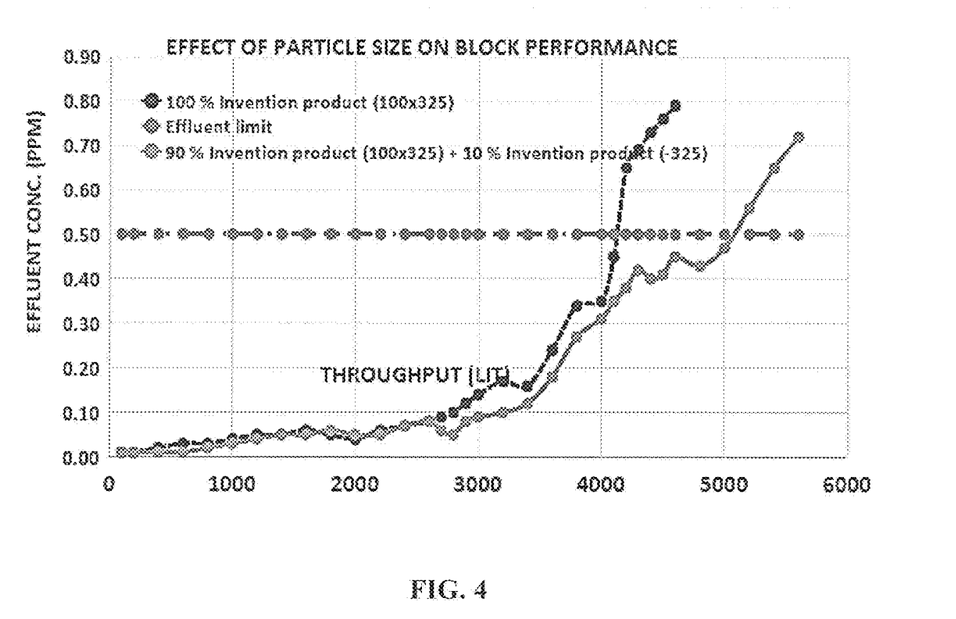
FIG. 4 depicts the concentration of chloramine (ppm) in the effluent versus throughput (L) for blocks made with 100% of the treated carbon product of the present invention (100×325) and combination of 90% 100×325 mesh invention product and 10%-325 mesh catalytically activated nitrogen-rich carbon products tested based on Example 4.

FIG. 4 depicts the concentration of chloramine (ppm) in the effluent versus throughput (L) for blocks made with 100% of the treated carbon product of the present invention (100×325) and combination of 90% 100×325 mesh invention product and 10%-325 mesh treated catalytically activated nitrogen-rich carbon products tested based on Example 4.

Table VII summarizes the approximate chloramine removal capacities for the carbon blocks tested based on Example 4.

TABLE VII

| Carbon material used to make the blocks | Chloramine removal capacities (L) |
|---|---|
| 100% treated carbon product (100 × 325) | 4200 |
| 90% treated carbon product (100 × 325 mesh) + 10% treated carbon product (−325 mesh) | 5000 |

Example 5

Figure 5:
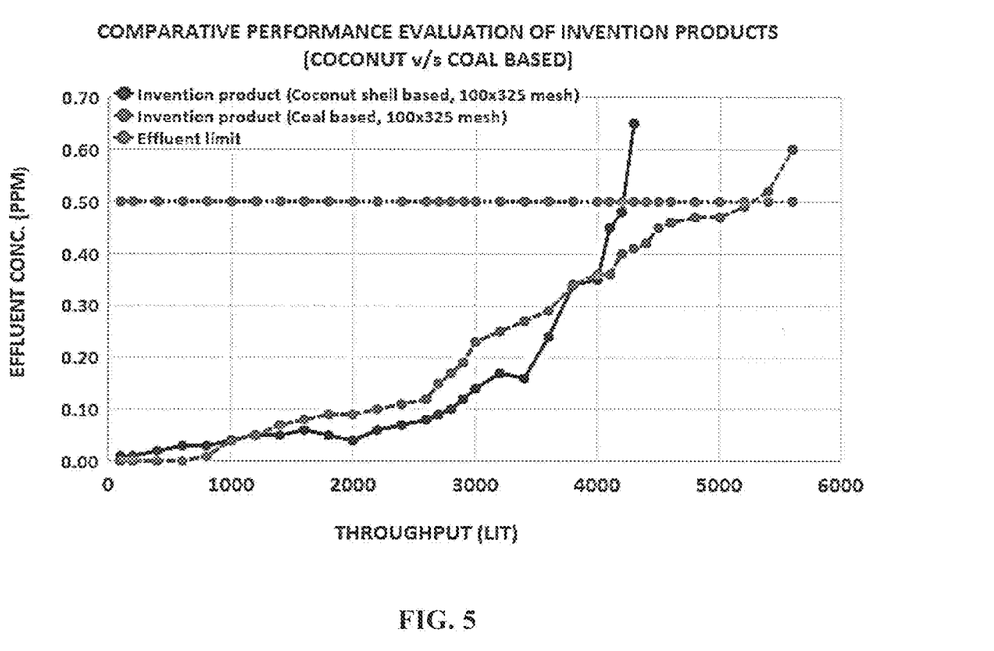
FIG. 5 depicts a concentration of chloramine (ppm) in the effluent versus throughput (L) for blocks made with 100% of the treated carbon product of the present invention (100×325 coconut-shell based) and invention product (100×325 coal-based) tested based on Example 5.

Comparative chloramine removal performance evaluation of the invention products (Coconut-shell based v/s Coal based), particle size 100×325
Block Dimension:
Length (L) 180 mm;
Inner diameter (ID) 10 mm;
Outer diameter (OD) 47 mm
Carbon to binder ratio: 70:30 by weight;
Total weight including cap 190 g;
Net weight of carbon: approx. 125 g;
Experimental flow rate 0.53 gpm FIG. 5 depicts a concentration of chloramine (ppm) in the effluent versus throughput (L) for blocks made with 100% of the treated carbon product of the present invention (100×325 coconut-shell based) and invention product (100×325 coal-based) tested based on Example 5.

Table VIII summarizes the approximate chloramine removal capacities for the carbon blocks tested based on Example 5.

TABLE VIII

| Carbon material used to make the blocks | Chloramine removal capacities (L) |
|---|---|
| 100% treated carbon product (100 × 325 coconut-shell based) | 4200 |
| 100% treated carbon product (100 × 325 coal-based) | 5200 |

Another embodiment of this technology is the ability to add antimicrobial activity, such as, bacteriostatic, bactericide, viricide. This can be accomplished by the addition of copper-zinc ions to the surface of the treated carbon product carbon. These complexes impart the anti-microbial activity to the carbon media without any detrimental effect on the chloramine reduction chemistry. Other anti-microbial complexes, e.g., silver, can also be used to supply anti-microbial activity.

Steps are taken to bind zinc and copper using anionic surfactant so that there is less leaching of zinc and copper from the carbon filter media X-Ray Diffraction Analysis (XRD) of Regular Activated Carbon (Coconut-Shell Based), Oxidized Activated Carbon and EPC5-G2 (the present catalytically activated Nitrogen-Rich Carbon Particles/Product)

X-Ray Diffraction (XRD) analysis was carried out on activated coconut-shell based carbon, oxidized activated carbon, and the treated carbon product of the present invention (EPC5-G2) to identify structural changes between regular activated carbon (coconut shell based), oxidized activated carbon, and the treated carbon product (EPC5-G2)

Sample Preparation

Samples were ground with a mortar and pestle and passed through a 200-mesh sieve (74-μm nominal opening size). Samples were loaded on a low-background plate for XRD measurements.

XRD patterns were acquired using a Bruker D2 Phaser equipped with a high-speed linear detector (LYNXEYE) and Cu K-alpha radiation (1.54184 Å) at 30 kV and 10 mA. The measurements were performed over a 2-theta range of 5 to 135 deg, with a scan speed of 1 sec/step and 0.02 deg increments.

Identification of crystalline materials was conducted using the Bruker Diffrac.Eva search/match software and the ICDD PDF-2 database.

Figure 6:
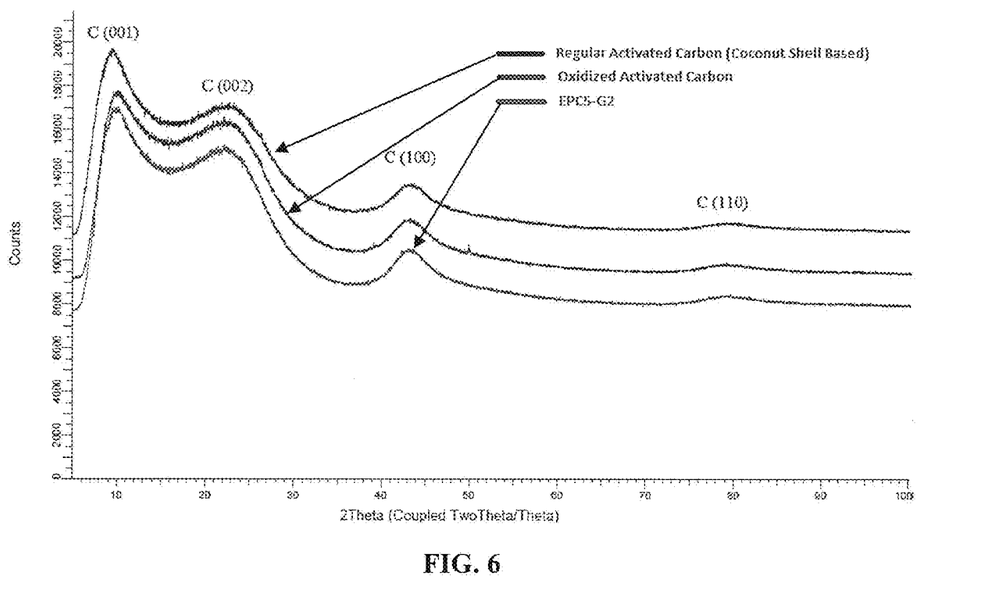
FIG. 6 depicts an overlay of XRD patterns of regular activated carbon (top line), oxidized activated carbon (middle line), and the treated carbon product of the present invention.

FIG. 6 depicts an overlay of XRD patterns of regular activated carbon (top line), oxidized activated carbon (middle line), and the treated carbon product of the present invention (melamine impregnated activated carbon) (bottom line). (For clarity, the patterns were shifted in intensity with respect to each other.)

Details of the center (2-theta), d-spacing and FWHM of the carbon peaks obtained by profile fitting for each sample are summarized in Table IX below:

TABLE IX

| | C (001) | | | C (002) | | | C (100) | | |
|---|---|---|---|---|---|---|---|---|---|
| Sample | 2-theta (deg) | d-spacing (Å°) | FWHM (deg) | 2-theta (deg) | d-spacing (Å°) | FWHM (deg) | 2-theta (deg) | d-spacing (Å°) | FWHM (deg) |
| Regular Activated Carbon | 8.784 | 10.067 | 4.458 | 23.710 | 3.753 | 5.541 | 42.841 | 2.111 | 3.560 |
| Oxidized Activated Carbon | 9.215 | 9.597 | 4.130 | 23.509 | 3.784 | 5.981 | 42.695 | 2.118 | 3.440 |
| EPC5-G2 | 9.043 | 9.779 | 4.317 | 23.503 | 3.785 | 5.783 | 42.719 | 2.117 | 3.585 |

Broad peaks of carbon were identified for all three samples, namely regular activated carbon, oxidized activated carbon and the treated carbon product. These samples exhibit four broad peaks corresponding to the (001), (002), (100) and (111) Bragg reflections of Carbon. The background broad peaks at 2θ values around 9, 23.5, and 43 refer to the amorphous structure of the activated carbon. The XRD pattern of the treated carbon product is very much similar to both coconut-shell based regular activated carbon and the oxidized activated carbon, and indicates that the overall structural integrity of regular activated carbon in the treated carbon product remains the same before and after the melamine modification except small changes in the d-spacing for C (001) and C (002) reflection patterns.

Fourier Transform Infrared Spectroscopy (FTIR) Analysis

The surface functional groups were determined by Fourier Transformed Infrared Spectroscopy (FTIR, Perkin Elmer). The carbon samples were mixed with KBr of spectroscopic grade and made as thin pellets using a hydraulic press at a pressure of 1 MPa. The pellets were about 10 mm in diameter and 1 mm in thickness. The pellet was placed in the IR beam for spectral analysis. The FTIR spectra of coconut-shell based regular activated carbon, oxidized activated carbon, and the treated carbon product were recorded between the spectral range of 4000 and 450 $cm^{-1}$.

Figure 7:
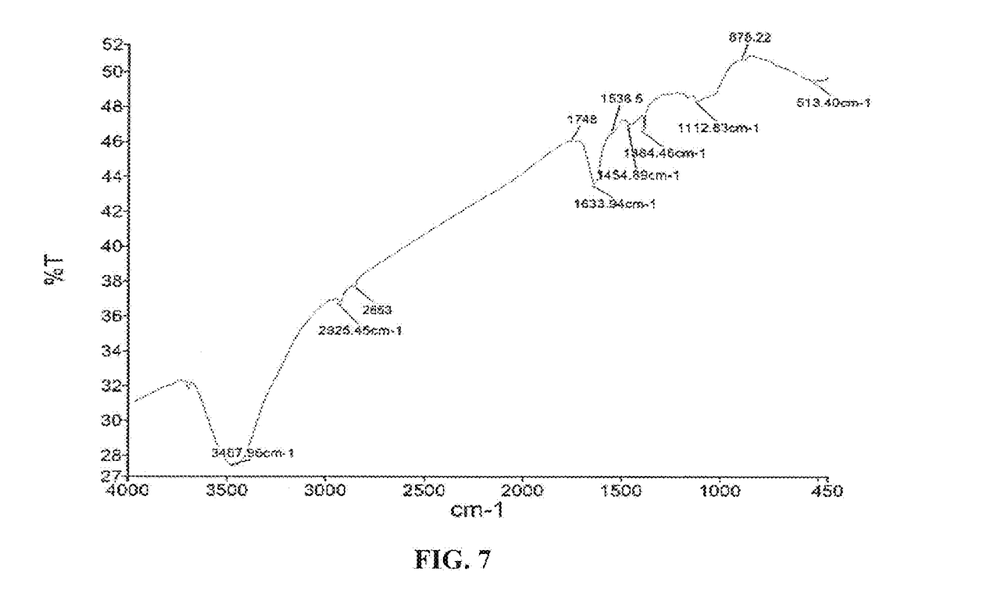
FIG. 7 depicts the FTIR spectrum of coconut-shell based regular activated carbon.

FIG. 7 depicts the FTIR spectrum of coconut-shell based regular activated carbon.

IR Peak Analysis of Regular Activated Carbon

The presence of the bands between 3600-3120 $cm^{-1}$ can be attributed to the stretching vibrations of N—H and O—H functional groups. The shoulder band at 2925-2853 cm-1 may originate from the asymmetric C—H stretching in the —CH, and —CH$_3$ groups. A very small peak near 1748 $cm^{-1}$ is assigned to the C═O stretching vibrations of ketones, aldehydes, lactones or carboxyl groups. The sharp band at 1634 $cm^{-1}$ indicates the presence of —C—H, —C═C— and characteristic aromatic C═C groups. The band at 1454 $cm^{-1}$ may correspond to the O—H bending band. Bands between 1300-1035 $cm^{-1}$ corresponds to C—O stretching vibration. Bands below 950 $cm^{-1}$ correspond to the out-of-plane deformation vibrations of the C—H groups in the aromatic structure.

Figure 8:
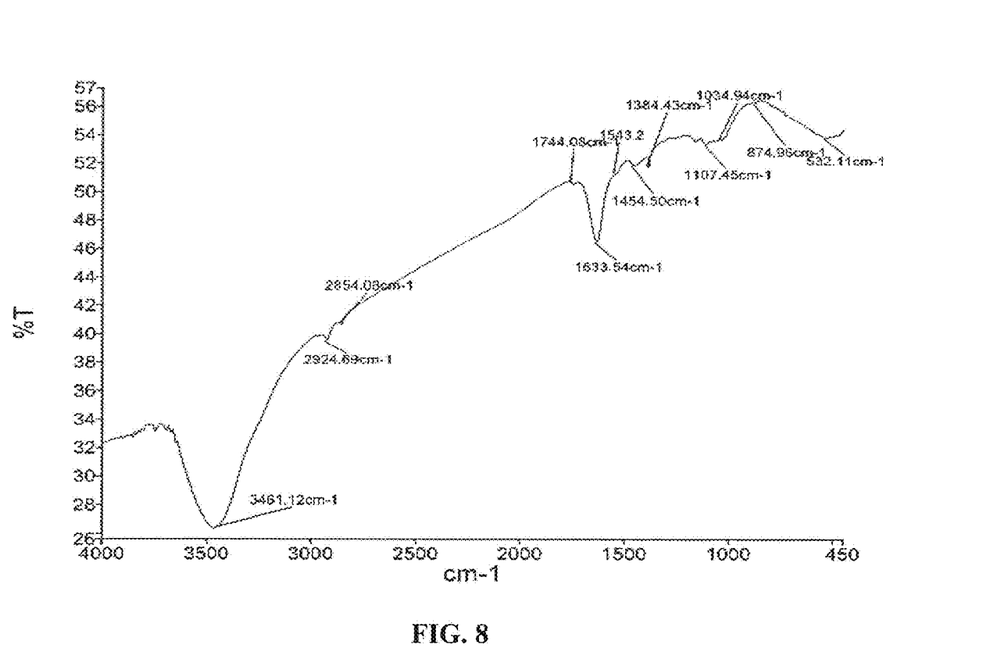
FIG. 8 depicts the FTIR spectrum of oxidized activated carbon.

FIG. 8 depicts the FTIR spectrum of oxidized activated carbon.

The FTIR spectrum of oxidized activated carbon is very much similar to that of regular activated carbon other than some minor band shifting. Here also, IR peaks at 3600-3160 $cm^{-1}$ region attributes to the stretching vibration of O—H and N—H functional groups. The bands at 2924-2854 $cm^{-1}$ corresponds to the asymmetric C—H stretching of —CH$_2$ and —CH$_3$ groups. A very small peak near 1744 $cm^{-1}$ is assigned to the C═O stretching vibrations of ketones, aldehydes, lactones or carboxyl groups. The sharp band at 1633 $cm^{-1}$ indicates the presence of —C—H, —C═C— and characteristic aromatic C═C groups. The band observed at 1543 $cm^{-1}$ corresponds to the asymmetric stretching vibration of N═O. The band at 1454 $cm^{-1}$ may correspond to the O—H bending band. Bands between 1300-1034 $cm^{-1}$ corresponds to C—O stretching vibration. Bands below 950 $cm^{-1}$ correspond to the out-of-plane deformation vibrations of the C—H groups in the aromatic structure.

FTIR Spectrum of the Treated Carbon Product

Figure 9:
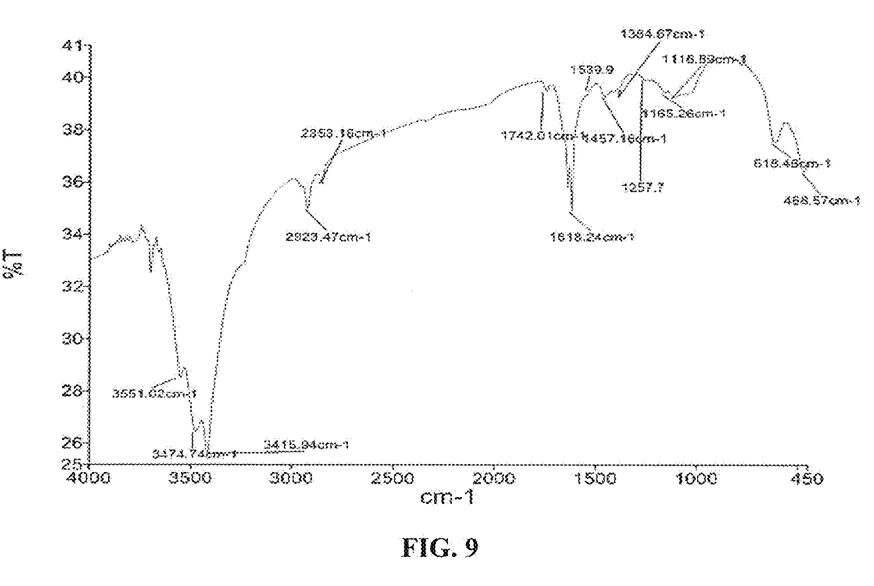
FIG. 9 depicts the FTIR Spectrum of the treated carbon product of the present invention.

FIG. 9 Depicts the FTIR Spectrum of the treated carbon product (Melamine Impregnated Activated Carbon).

The FTIR spectrum of the treated carbon product (melamine impregnated activated carbon) resembles that of regular activated carbon with some additional peaks. IR peaks at 3600-3130 $cm^{-1}$ region attributes to the stretching vibration of O—H and N—H functional groups. The bands at 2923-2853 $cm^{-1}$ corresponds to the asymmetric C═H stretching of —CH$_2$ and —CH$_3$ groups. A very small peak near 1742 $cm^{-1}$ is assigned to the C═O stretching vibrations of ketones, aldehydes, lactones or carboxyl groups. The sharp band at 1618 $cm^{-1}$ indicates the presence of —C—H, —C═C— and characteristic aromatic C═C groups. The band at 1457 $cm^{-1}$ corresponds to the pyridinic C═N stretching vibration. The band observed at 1540 $cm^{-1}$ corresponds to the asymmetric stretching vibration of N═O. The band at 1257 $cm^{-1}$ may corresponds to C—N vibration. Bands between 1300-1035 $cm^{-1}$ corresponds to C—O stretching vibration. Bands below 950 $cm^{-1}$ correspond to the out-of-plane deformation vibrations of the C—H groups in the aromatic structure.

In summary, FTIR is a well-known method for analyzing surface chemistry. It can be used to detect the functional groups present in the sample. IR Spectroscopy measures the vibrations of atoms and based on this it is possible to determine the functional groups. IR analysis involves the characterization of a material with respect to the presence or absence of a specific group's frequency associated with one or more fundamental modes of vibration. Here Fl IR spectroscopic analysis is performed on coconut-shell based regular activated carbon, oxidized activated carbon and the resultant activated nitrogen-rich (i.e., melamine treated) carbon of the invention (referred to on some figures as EPC5-G2) in order to identify the types of surface functional groups present in those sample. Table X summarizes the IR assignments of functional groups on coconut-shell based activated carbon, oxidized activated carbon and activated nitrogen-rich carbon of the invention (EPC5-G2):

TABLE X

| Functional Groups | Assignment | IR Peaks ($cm^{-1}$) | | |
| --- | --- | --- | --- | --- |
| | | Coconut-shell based regular activated carbon | Oxidized activated carbon | nitrogen-rich (Melamine) carbon (EPC5-G2) |
| —OH | O—H stretching vibration | 3467 | 3461 | 3474 |
| —NH | N—H stretching vibration | — | — | 3551 |
| —CH$_2$ | C—H asymmetric stretching C—H symmetric stretching | 2925 2853 | 2924 2854 | 2923 2853 |
| C═O | Stretching vibration of C═O | 1748 | 1744 | 1742 |
| C═C | Stretching vibration of C═C in aromatic rings | 1634 | 1633 | 1618 |
| C═N | Pyridinic C═N str. vibration | — | — | 1457 |

TABLE X-continued

| Functional Groups | Assignment | Coconut-shell based regular activated carbon | Oxidized activated carbon | nitrogen-rich (Melamine) carbon (EPC5-G2) |
|---|---|---|---|---|
| | | IR Peaks (cm$^{-1}$) | | |
| N=O | Nitro N=O str. vibration | 1543 | 1543 | 1540 |
| C—O | Stretching of C—O functional groups | 1059, 1112, 1165, 1250 | 1034, 1107, 1165, 1262 | 1034, 1116, 1165, 1251 |
| C—N | C—N stretching band in the aromatic ring | — | — | 1257 |

As observed from FIGS. 8 and 9, the IR spectrum of oxidized activated carbon is similar to that of coconut-shell based regular activated carbon except for the stronger peaks in the spectrum, suggesting higher intensities in the oxygen functional groups. It can be suggested from the spectra that the main oxygen groups present in the coconut-shell based regular activated carbon, oxidized activated carbon, and the treated carbon product are carbonyl, ethers, and alcohols group. The IR spectrum of the treated carbon product (EPC5-G2) is also similar to both coconut-shell based regular activated carbon and the oxidized activated carbon except for the appearance of some additional bands (such as pyridinic C=N stretching band at 1465 cm$^{-1}$) due to melamine modification. As evident from these IR spectra, the overall structural integrity of regular activated carbon in the activated nitrogen-rich carbon of the invention (EPC5 G2) remains the same before and after the melamine modification except some additional spectral peaks indicating pyridinic and aromatic nitrogen functional groups.

Chlorine Removal Performance of the Treated Carbon Product (EPC5-G2) as a Block Used in Plumbed-In Systems The chlorine removal test was performed in a flow-through system as per a method based on the NSF/ANSI Standard 42 (Drinking Water Treatment—Aesthetic Effects. A 2 mg/L aqueous chlorine test solution was prepared having a pH of 7.6 total dissolved solids of 200-500 mg/L; a hardness less than 170 mg/L as CaCO$_3$; turbidity of less than 1 Nephelometric Turbidity Units; and a temperature of 20±3° C.

The aqueous chlorine test solution described above was flowed through the filtration system for 5 minutes to wet out the carbon block sample. After this, samples of the effluent (outflow from the carbon block sample) were taken periodically and the throughput in liter was recorded. Effluent samples were analyzed for chlorine by the DPD Total Chlorine Method, Hach Method 8167. Free chlorine was maintained at a negligible concentration (<0.1 ppm), thus, the total chlorine analysis was considered a good approximation of the concentration of chlorine in the effluent. The chlorine effluent concentration was then plotted as a function of the aqueous chlorine test solution throughput. The maximum effluent chlorine concentration per NSF 42 is 1.0 mg/L. Capacity of the carbon block sample is reported as the throughput attained before the concentration of chlorine in the effluent is 1.0 mg/L.

Figure 10:
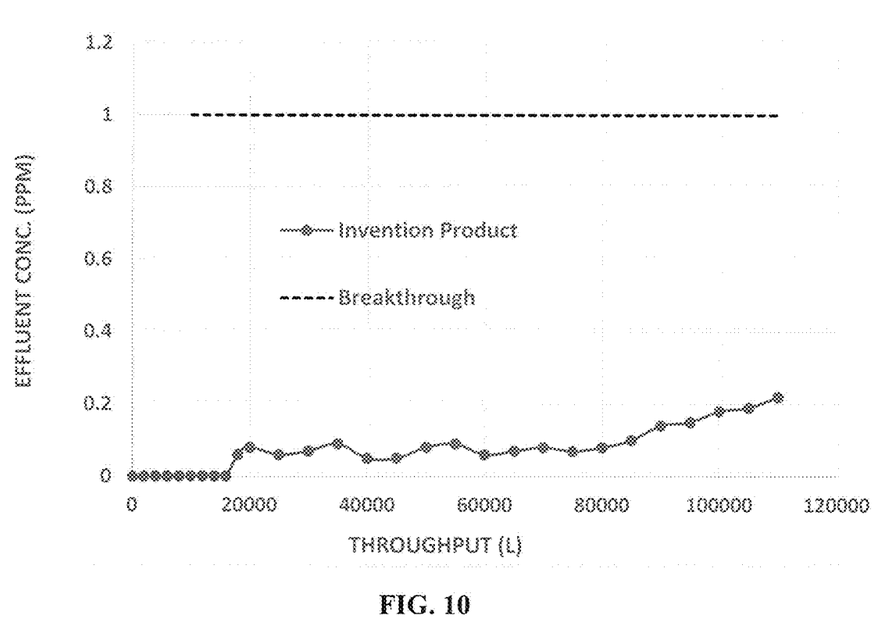
FIG. 10 depicts the concentration of chlorine (ppm) in the effluent versus throughput (L) for the treated carbon product of the present invention.

Block dimensions:
Length (L): 236 mm
Inner diameter (ID): 31 mm
Outer diameter (OD): 60 mm
Net weight of carbon: approx. 280 g
Experimental flow rate: 1 gpm FIG. 10 depicts the concentration of chlorine (ppm) in the effluent versus throughput (L) for the treated carbon product of the present invention. As shown, the block passed more than 115000 L of chlorine at a flow of 1 gallon per minute. Thus, the block passed more than its targeted life for chlorine reduction.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A method of making catalytically activated carbon particles comprising:
   providing a starting material in the form of an activated carbonaceous product;
   soaking said activated carbonaceous product in an acid solution to form acid treated carbon;
   drying said acid treated carbon;
   exposing said acid treated carbon to a nitrogen-rich compound to form nitrogen-rich impregnated carbon particles;
   heating said nitrogen-rich impregnated carbon particles in an inert atmosphere, and
   cooling said impregnated carbon particles to form catalytically activated nitrogen-rich carbon particles that remove chloramines, chlorine and/or ammonia from aqueous media, wherein said nitrogen-rich compound is a nitrogen-rich triazine compound.

2. The method of claim 1 wherein said activated carbonaceous product includes coconut based activated carbon or coal based activated carbon in either granular (GAC) or powdered (PAC) form.

3. The method of claim 1 wherein said activated carbonaceous product has a surface area ranging from about 800 m$^2$/g to about 1300 m$^2$/g.

4. The method of claim 1 wherein said step of soaking said activated carbonaceous product in an acid solution includes soaking in 15% nitric acid for approximately three hours.

5. The method of claim 1 wherein said step of drying said acid treated carbon includes drying until moisture content of said acid treated carbon is about or less than two (2)%.

6. The method of claim 5 wherein said step of drying said acid treated carbon includes drying at a temperature of approximately 80° C.

7. The method of claim 1 wherein said step of exposing said acid treated carbon to a nitrogen-rich compound includes contacting said nitrogen-rich compound in either solid phase or solution.

8. The method of claim 7 wherein said nitrogen-rich compound comprises melamine (1,3,5-Triazine-2,4,6-triamine, $C_3H6N_6$, molar mass 126.12 g/mol) having over 60% of nitrogen by total mass.

9. The method of claim 8 wherein said melamine is approximately between 10%-15% of the weight of said activated carbonaceous product.

10. The method of claim 8 wherein said melamine is added to water to form a white suspension, and the suspension is used to impregnate the acid-treated carbon.

11. The method of claim 1 wherein said nitrogen-rich triazine compound is selected from the group consisting of cyanuric acid, ammelide, ammeline, trichloromelamine, and combinations thereof.

12. The method of claim 1 wherein said inert atmosphere comprises argon gas or nitrogen gas.

13. The method of claim 1 where said step of cooling includes cooling said catalytically activated nitrogen-rich carbon particles in an oxygen-free or inert atmosphere to room temperature.

14. A method of making catalytically activated carbon particles comprising:
   providing a starting material in the form of an activated carbonaceous product;
   soaking said activated carbonaceous product in an acid solution to form acid treated carbon;
   drying said acid treated carbon;
   exposing said acid treated carbon to a nitrogen-rich compound to form nitrogen-rich impregnated carbon particles;
   heating said nitrogen-rich impregnated carbon particles in an inert atmosphere; and
   cooling said impregnated carbon particles to form catalytically activated nitrogen-rich carbon particles that remove chloramines, chlorine, and/or ammonia from aqueous media;
   wherein said step of heating said nitrogen-rich impregnated carbon particles in an inert atmosphere includes heating at a temperature in the range of 750° C. to 800° C.

15. A filter media comprising an activated carbonaceous product impregnated with a nitrogen-rich compound to provide, after heating and cooling, catalytically activated nitrogen-rich carbon particles that remove chloramines, chlorine, and/or ammonia from aqueous media, wherein said nitrogen-rich compound is a nitrogen-rich triazine compound.

16. The filter media of claim 15 wherein said activated carbonaceous product includes coconut based activated carbon or coal based activated carbon.

17. The filter media of claim 16 wherein said activated carbonaceous product has a surface area ranging from about 800 $m^2$/g to about 1300 $m^2$/g.

18. The filter media of claim 15 wherein said nitrogen-rich triazine compound is selected from the group consisting of cyanuric acid, ammelide, ammeline, trichloromelamine, and combinations thereof.

19. The filter media of claim 15 wherein said nitrogen-rich compound is melamine (1,3,5-Triazine-2,4,6-triamine, $C_3H_6N_6$, molar mass 126.12 g/mol) having over 60% of nitrogen by total mass, wherein said nitrogen-rich compound is approximately 10%-15% weight of said coconut based activated carbon or coal based activated carbon.

* * * * *

UNITED STATES PATENT AND TRADEMARK OFFICE
CERTIFICATE OF CORRECTION

PATENT NO. : 10,953,386 B2
APPLICATION NO. : 16/234053
DATED : March 23, 2021
INVENTOR(S) : Nabin Kumar Pal et al.

It is certified that error appears in the above-identified patent and that said Letters Patent is hereby corrected as shown below:

In the Specification

Column 8, Line 51, delete "(DFI)" and substitute therefor -- "(DFT)" --

Column 18, Line 8, delete "Depicts" and substitute therefor -- "depicts" --

Column 18, Line 15, delete "C=H" and substitute therefor -- "C-H" --

In the Claims

Column 21, Line 7, delete "C3H6N6" and substitute therefor -- "$C_3H_6N_6$" --

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*